(12) United States Patent
Uranaka et al.

(10) Patent No.: US 6,789,639 B2
(45) Date of Patent: Sep. 14, 2004

(54) CARRIER VEHICLE

(75) Inventors: Kyouji Uranaka, Yokohama (JP);
Satoshi Ogawa, Oyama (JP); Koichi Okamoto, Yokohama (JP); Takao Nagai, Yokohama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/644,908

(22) Filed: Aug. 21, 2003

(65) Prior Publication Data
US 2004/0060755 A1 Apr. 1, 2004

(30) Foreign Application Priority Data
Aug. 22, 2002 (JP) ........................................ 2002-241637

(51) Int. Cl.[7] ........................ B62D 61/10; B60K 17/354
(52) U.S. Cl. ................................. 180/245; 180/24.06
(58) Field of Search ................................. 180/245, 246, 180/233, 24.06, 24.07, 23, 24; 298/17 R, 19 R

(56) References Cited

U.S. PATENT DOCUMENTS

| | | | |
|---|---|---|---|
| 3,502,165 A | * | 3/1970 | Matsukata .................. 180/23 |
| 4,090,415 A | * | 5/1978 | Gorrell et al. ............. 180/69.6 |
| 4,142,600 A | * | 3/1979 | Campbell .................... 180/305 |
| 4,368,793 A | * | 1/1983 | Igarashi ..................... 180/14.4 |
| 4,469,369 A | * | 9/1984 | Belik et al. ................. 296/178 |
| 4,664,446 A | * | 5/1987 | Word ........................ 298/8 H |
| 6,138,783 A | * | 10/2000 | Chene et al. ................. 180/11 |

* cited by examiner

Primary Examiner—Avraham Lerner
(74) Attorney, Agent, or Firm—Varndell & Varndell PLLC

(57) ABSTRACT

To provide a carrier vehicle capable of restraining an increase in cost of a power train, the carrier vehicle is constructed by front axles provided respectively steerably on left and right sides of a front portion of the vehicle and mounted with wheels, a first engine provided at the front portion of the vehicle, a first drive axle provided at a middle portion of the vehicle and mounted with wheels at both left and right ends thereof, a first transmission, a second drive axle provided at a rear portion of the vehicle and mounted with wheels at both left and right ends thereof, a second engine provided at the rear portion of the vehicle and on an upper side of the second drive axle, and a second transmission provided to connect to a front side of the second engine.

1 Claim, 3 Drawing Sheets

CARRIER VEHICLE

BACKGROUND OF THE INVENTION

1. Field of the Invention

The present invention relates to a carrier vehicle.

2. Description of the Related Art

The carrier vehicle is an operation vehicle for loading and carrying a load loaded and unloaded by a fork lift above a load carrying platform, or loading and carrying soil or rock loaded by a wheel loader or a hydraulic excavator above an inclinable load carrying platform.

FIG. 3 is an outline side view showing a power train of an off road type dump truck which is a carrier vehicle. As shown by FIG. 3, an off road type dump truck having a dump vessel 38 inclined by a hydraulic cylinder, not illustrated, at an upper portion thereof is mounted with front wheels 35F at steerable front axles 34F respectively provided on left and right sides of a front portion of the vehicle and mounted with rear wheels 35R at both left and right ends of a rear axle 34R provided at a rear portion of the vehicle. A power train of the dump truck subjects an output or an engine 31 provided at the front portion of the vehicle to speed change by a transmission 32 mounted at a middle portion of the vehicle and the rear wheels 35R are driven by transmitting the output of the engine 31 from the transmission 32 to the rear axle 34R via a propeller shaft 33.

However, according to the above-described related art, a problem described below is posed.

That is, although it is conceivable to promote large-sized formation of a carrier vehicle to achieve promotion of operability at a large-scale operation site, in this case, in accordance with fabrication of the large-sized carrier vehicle, not only the engine 31 to which large power is requested but also respective components constituting the power train of the transmission 32, the propeller shaft 33 and tires become large-sized and special. Therefore, production facilities and productivity of the respective components constituting the power train become problematic and cost of the power train becomes very high.

SUMMARY OF THE INVENTION

The invention has been carried out by paying attention to the above-described problem and it is an object thereof to provide a carrier vehicle capable of restraining an increase in cost of a power train in accordance with large-sized formation of the vehicle.

In order to achieve the above-described object, a carrier vehicle is constructed by a constitution including front axles provided respectively steerably on left and right sides of a front portion of the vehicle and mounted with wheels, a first engine provided at the front portion of the vehicle, a first drive axle provide data middle portion of the vehicle and mounted with wheels at both left and right ends thereof, a first transmission provided to connect to a rear side of the first engine for transmitting a drive force of the first engine to the first drive axle, a second drive axle provided at a rear portion of the vehicle and mounted with wheels at both left, and right ends thereof, a second engine provided at the rear portion of the vehicle and on an upper side of the second drive axle, and a second transmission provided to connect to a front side of the second engine for transmitting a drive force of the second engine to the second drive axle via a transfer.

According to the above-described constitution, the drive axles are provided at the middle portion and the rear portion of the vehicle and driven by the power trains separate from each other and therefore, an output necessary for each of the power trains becomes as small as, for example, substantially a half of an output necessary for the carrier vehicle. Therefore, even when a large-sized carrier vehicle is fabricated, each of components (engine, transmission and the like) constituting the power train becomes comparatively small-sized in accordance with an output necessary for each of the power trains.

The cost of a complicated and fine component of the engine or the transmission becomes very high owing to problems of production facilities and productivity when a large-sized component is fabricated. However, according to the invention, even when a carrier vehicle is large-sized, a power train including an engine and a transmission does not become large-sized and special in correspondence with large output but each of components of the power train becomes comparatively small-sized and therefore, large-sized formation of the component is prevented, an increase in the cost can significantly be restrained and a large-sized carrier vehicle at low cost can be provided.

DETAILED DESCRIPTION OF THE PROFFERED EMBODIMENTS

An embodiment will be explained in reference to the drawings as follows.

Further, in the specification, respective front and rear, left and right and up and down directions respectively signify respective front and rear, left and right and up and down directions of a carrier vehicle according to the invention.

Figure 1:
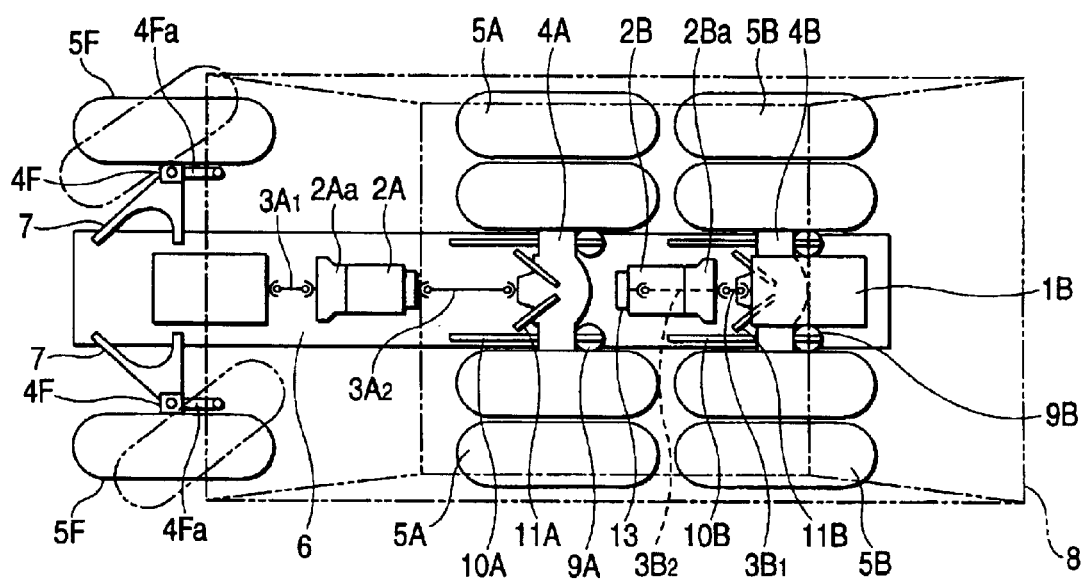
FIG. 1 is a plane view of a carrier vehicle according to an embodiment.
Figure 2:
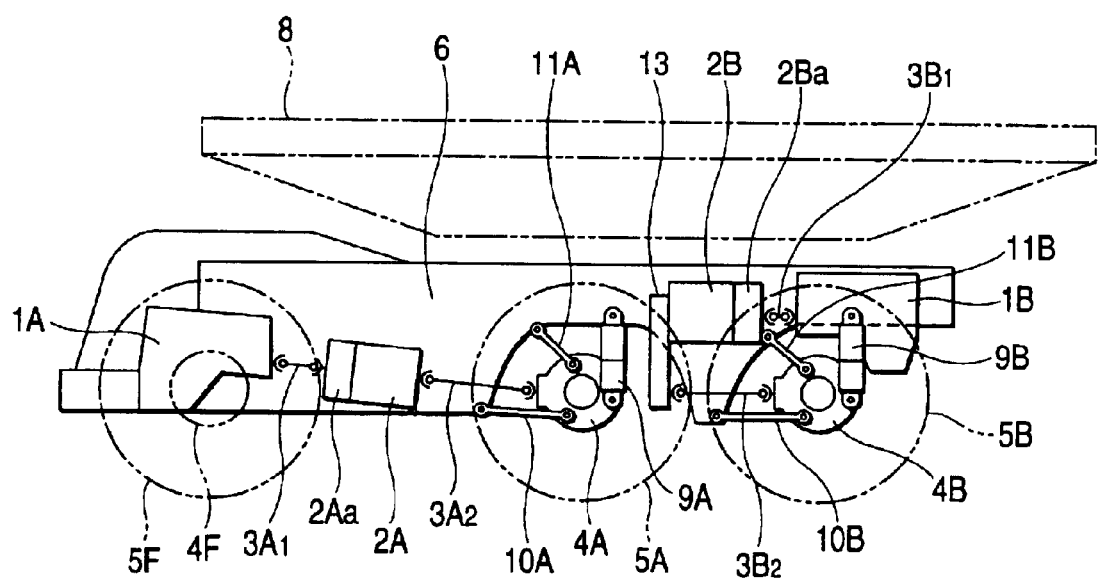
FIG. 2 is a side view of the carrier vehicle according to the embodiment.
Figure 3:
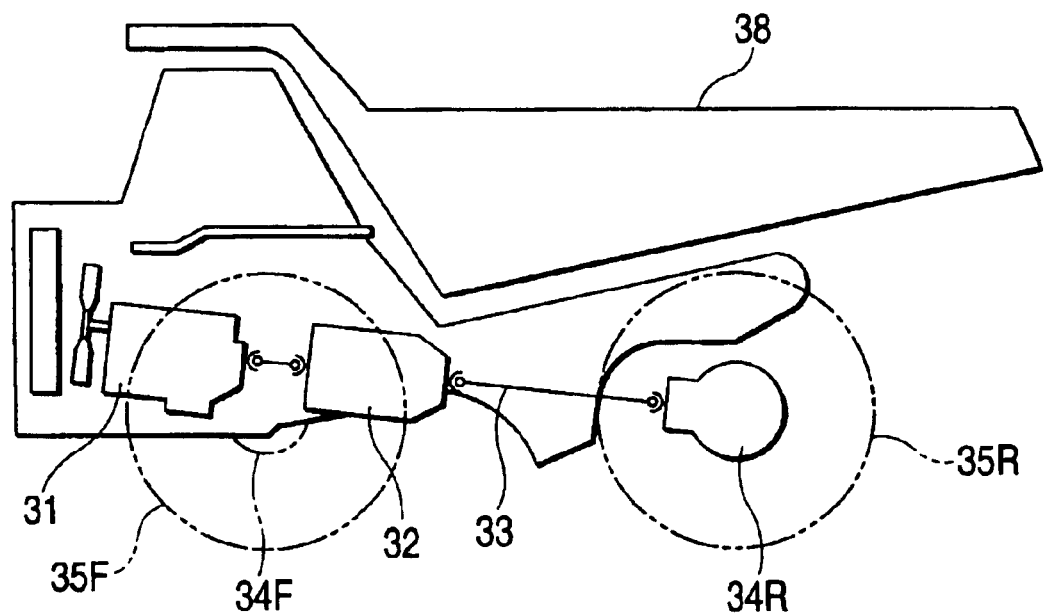
FIG. 3 is a side view of a carrier vehicle of a related art.

FIG. 1 is a plane view of a carrier vehicle and FIG. 2 is a side view of the carrier vehicle.

A vehicle body frame 6 is provided at a central portion in a vehicle width direction along the front and rear direction and an upper portion of the vehicle body frame 6 is mounted with a dump vessel 8 inclined by a hydraulic cylinder, not illustrated. By inclining the dump vessel 8, discharge of a loaded object of soil or rock is facilitated.

Both left and right side faces of a front portion of the vehicle body frame 6 are respectively provided with arms 7 base end portions of which are connected to the vehicle body frame 6 rockably around front and rear axes. A front end of the arm 7 is provided with a front axel 4F and the front axel 4F is mounted with a front wheel 5F. Further, a front end of a lever 4Fa projected rearward from the front shaft 4F is connected with a steering mechanism of a steering cylinder or the like, not illustrated, to make the front axel 4F steerable.

A middle portion of the vehicle body frame 6 on a rear side thereof is provided with a first drive axle 4A supported by a shock absorbing mechanism having suspension cylinders 9A and rods 10A and 11A and both end portions of the first drive axle 4A are mounted with wheels 5A.

A rear portion of the vehicle body frame 6 is provided with a second drive axle 4B supported by a shock absorbing mechanism having suspension cylinders 9B and rods 10B and 11B and both end portions of the second drive axle 4B are mounted with wheels 5B.

A power train for the first drive axle 4A will be explained.

The front portion of the vehicle body frame 6 is mounted with a first engine 1A and a first transmission 2A is mounted between the first engine 1A and the first drive axle 4A. Further, notation 2Aa designates a torque converter attached to be provided on an input side of the first transmission 2A. The first engine 1A and the first transmission 2A are connected by a propeller shaft 3A1 and the first transmission 2A and the first drive axle 4A are connected by a propeller shaft 3A2.

Thereby, an output of the first engine 1A is transmitted to the first transmission 2A via the propeller shaft 3A1. The output of the first engine 1A subjected to speed change by the first transmission 2A is transmitted to the first drive axle 4A via the propeller shaft 3A2 to drive the wheel A.

A power train for the second drive axle 4B will be explained.

A second engine 1B is mounted at the rear portion of the vehicle body frame 6 and on an upper side of the second drive axle 4B and a second transmission 2B is mounted between the second engine 1B and the first drive axle 4A. Further, notation 2Ba designates a torque converter attached to be provided to an input side of the second transmission 2B. Further, an output side of the second transmission 2B is mounted with a transfer 13 for shifting an output to a lower side. The second engine 1B and the second transmission 2B are connected by a propeller shaft 3B1 and the transfer 13 and the second drive axle 4B are connected by a propeller shaft 3B2.

Thereby, an output of the second engine 1B is transmitted to the second transmission 2B via the propeller shaft 3B1. The output of the second engine 1B subjected to speed change by the second transmission 2B is led to a lower side by the transfer 13 and transmitted to the second drive axle 4B via the propeller shaft 3B2 to drive the wheel 5B.

According to the above-described constitution, the two drive axles 4A and 4B are provided at the rear portion of the vehicle body and driven by the power trains separate from each other and therefore, an output necessary for each of the power trains becomes smaller than an output necessary for the carrier vehicle. Therefore, even when a large-sized carrier vehicle is fabricated, each of the components (engine 1A, 1B, transmission 2A, 2B and the like) constituting the power train becomes comparatively small-sized in accordance with the output necessary for each of the power trains.

In the case of a complicated and fine component of the engine, the transmission or the like, when a large-sized component is fabricated, cost thereof becomes very high owing to problems of production facilities and productivity and when the components are fabricated at each of the two front and rear axles, the axle including a differential or the wheel including the tire becomes large-sized and special and cost thereof is increased. However, according to the embodiment, as described above, even when the carrier vehicle is large-sized, the power train including the engine and transmission does not become large-sized and special in correspondence with large output, each of the components of the power train becomes comparatively small-sized and therefore, large-sized formation of the component is prevented, an increase in cost can significantly be restrained and a large-sized carrier vehicle can be provided at low cost.

Further, the two drive axles 4A and 4B are provided and driven by the power trains separate from each other and therefore, major components of the respective power trains, the engines 1A and 1B, are transmissions 2A and 2B, the drive axles 4A and 4B, and the wheel 5A and 5B can be made common. Therefore, the cost of the component made common becomes low, production control thereof is facilitated and a carrier vehicle at low cost can be provided.

Further, even when a large-sized carrier vehicle is fabricated, a comparatively small-sized one of each of the components of the power line can deal therewith and therefore, a component of a power line mass-produced in other kind of machine can be applied thereto. Particularly, with regard to the power train for the first drive axle 4A, a total of a power line of a dump truck having a corresponding output can be applied thereto as it is. Thereby, the large-sized carrier vehicle can be provided at significantly low cost.

Further, the invention is not limited to the above-described embodiment but can naturally be changed or modified within the range of the invention.

For example, although an explanation has been given of an example of using the shock absorbing mechanisms having the suspension cylinders 9A and 9B and the rods 10A, 10B, 11A and 11B as mechanisms of supporting the drive axles 4A and 4B, other type of the shock absorbing mechanism may be applied thereto and there may be constructed a constitution of mounting the drive axles 4A and 4B rigidly to the vehicle body frame 6.

Although an explanation has been given by taking an example of mounting the dump vessel 8 inclined by the hydraulic cylinder as the load carrying platform of the carrier vehicle, the carrier vehicle may be mounted with a flat load carrying platform for loading and unloading a pallet or a container by a fork lift.

The carrier vehicle of the invention is applicable also to a manned vehicle having a drive seat and applicable also to an unmanned vehicle run by wireless or program.

Further, although an explanation has been given of an example of using the transmission having the torque converter, the torque converter may be omitted.

What is claimed is:

1. A carrier vehicle comprising:

front axles provided respectively steerably on left and right sides of a front portion of the vehicle and mounted with wheels;

a first engine provided at the front portion of the vehicle;

a first drive axle provided at a middle portion of the vehicle and mounted with wheels at both left and right ends thereof;

a first transmission provided to connect to a rear side of the first engine for transmitting a drive force of the first engine to the first drive axle;

a second drive axle provided at a rear portion of the vehicle and mounted with wheels at both left and right ends thereof;

a second engine provided at the rear portion of the vehicle and on an upper side of the second drive axle; and a second transmission provided to connect to a front side of the second engine for transmitting a drive force of the second engine to the second drive axle via a transfer.

* * * * *